United States Patent [19]

Ninomiya

[11] 4,329,719
[45] May 11, 1982

[54] APPARATUS FOR GENERATING TIME CODE SIGNALS

[75] Inventor: Ichiro Ninomiya, Atsugi, Japan
[73] Assignee: Sony Corporation, Tokyo, Japan
[21] Appl. No.: 31,031
[22] Filed: Apr. 18, 1979

Related U.S. Application Data

[63] Continuation-in-part of Ser. No. 956,449, Nov. 1, 1978, Pat. No. 4,189,756.

[30] Foreign Application Priority Data

Nov. 5, 1977 [JP] Japan .................................. 52-132853
Apr. 20, 1978 [JP] Japan .................................. 53-46934

[51] Int. Cl.³ ........................ G11B 27/32; H04N 5/78
[52] U.S. Cl. ......................................... 360/14; 360/49
[58] Field of Search .................... 360/14, 72.2, 42, 43, 360/49

[56] References Cited

U.S. PATENT DOCUMENTS 3,739,086 6/1973 Heather .............................. 360/42
4,189,756 2/1980 Ninomiya ............................. 360/14

FOREIGN PATENT DOCUMENTS 1350233 4/1974 United Kingdom ................. 360/41
1351863 5/1974 United Kingdom ................. 360/41
1387760 3/1975 United Kingdom ................. 360/41

Primary Examiner—Bernard Konick
Assistant Examiner—Alan Faber
Attorney, Agent, or Firm—Lewis H. Eslinger; Alvin Sinderbrand

[57] ABSTRACT

An apparatus for generating a recording time code signal having a time code data signal generator and a time code signal forming circuit which is supplied with a time code data signal from the time code data signal generator and produces a recording time code signal consisting of bi-phase coded signals, in which the above recording time code signal is corresponded to an information signal and then recorded on a recording medium continuously at word unit. In this case, the polarity of a specific bit signal of a fixed binary bit or value in the above recording time code signal of word unit is discriminated, and a changing circuit is provided in the time code signal forming circuit which changing circuit changes the above fixed binary bit in accordance with the polarity of the specific bit signal. Thus, a recording time code signal of word unit, which has a constant polarity of bit signals after the above specific bit signal, is derived from the time code signal forming circuit.

3 Claims, 3 Drawing Figures

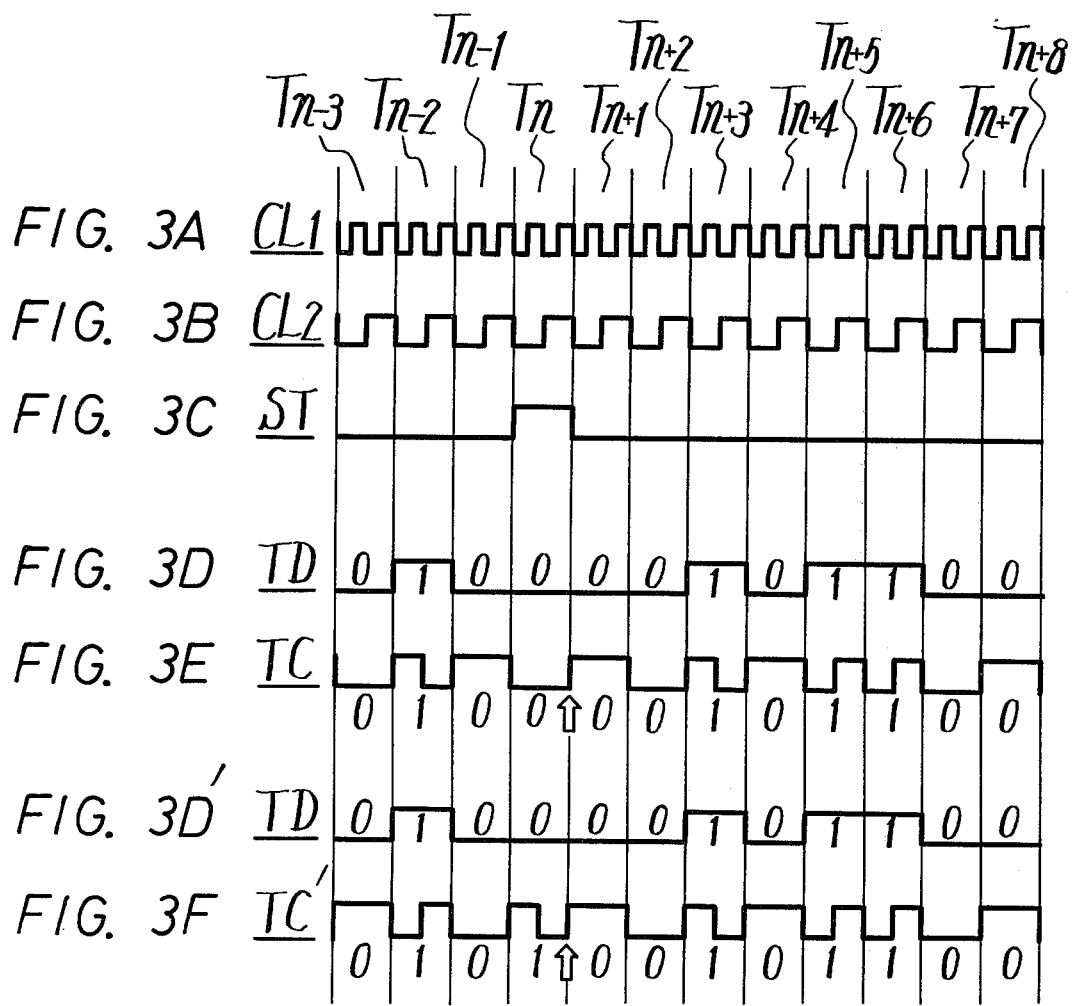

APPARATUS FOR GENERATING TIME CODE SIGNALS

CROSS-REFERENCES TO RELATED APPLICATION

This application is a continuation - in - part of the application Ser. No. 956,449 filed on Nov. 1, 1978, now U.S. Pat. No. 4,189,756.

BACKGROUND OF THE INVENTION

This invention relates to apparatus for generating coded characters and, more particularly, to such apparatus wherein a bi-phase coded character is generated having a constant relation between the phases at the beginning and end of each coded character regardless of the number of "1" s and "0" s included in that character. In accordance with a specific aspect of this invention, an SMPTE time code character is generated having a level transition at the start thereof which is of the same phase, or polarity, as the level transition at the end thereof.

With the advent of video recording and playback devices, such as the video tape recorder (VTR), various situations may arise wherein a recorded medium, such as recorded video tape, should be edited such that a certain information thereon is replaced by other, desired information, or that a certain additional information is recorded immediately following a previously recorded segment. The former editing operation is known as an insert edit wherein, for example, one or more frames of video signals which are recorded on one video tape are replaced by an equal number of frames of video signals which has been recorded on another video tape. The latter edit operation is known as an assemble edit wherein one of more frames of video signals which has been recorded on another video tape are transferred, or re-recorded, onto the main video tape, whereby an entire program may be "assembled".

As may be appreciated, in order to carry out an insert edit or an assemble edit operation, that is, an operation wherein video signals which had been recorded on a secondary tape are transferred, or re-recorded, onto a primary tape, two separate VTR's are needed for controlling the respective playback and recording operations of the secondary and primary tapes. The secondary VTR must be operated to ascertain those frames containing the video information which must be transferred to the primary tape and the primary VTR must be controlled so as to ascertain the precise location on the primary tape at which the secondary information is to be recorded. Furthermore, both VTR's must be operated in synchronism with each other.

In order to facilitate such editing operations, and particularly, to identify the specific frames of video signals which are to be edited, a standardized code has been developed, known as the SMPTE time code. This SMPTE time code is a serial code formed of a predetermined number of binary bits which are recorded as phase-modulated, or bi-phase signals. In accordance with the present standard, the SMPTE time code contains eighty bi-phase bits which represent, in BCD format, an indication of the time at which each frame of video signals is recorded, a frame count and optional binary word information. This time code also includes a sixteen bit synchronizing word and a number of so called binary groups which may be used either for future information or as the user of the video tape so desires. A more complete description of this SMPTE time code is described in "Standardization for Time Control Code for Video Tape and Audio Recorders" by E. K. Dahlin, December 1970, Journal of the SMPTE, Vol. 79, page 1086. Another proposal for a standardized time code for video recording is the EBU time code.

In the bi-phase representation of binary bits, the beginning of each bit period is marked by a level transition, either a positive transition from a lower to a higher level or a negative transition. A binary "1" is represented by yet another level transition during the bit period, while a binary "0" is represented by the absence of any additional bit transitions throughout the bit period. In recording the SMPTE time code on a video tape, the bi-phase signals are recorded in seriatum along a longitudinal edge of the tape such that the beginning of an SMPTE character starts at the beginning of the frame of video signals and ends at the end of that frame of signals. Thus, the end of one SMPTE character is coincident with the beginning of the next following SMPTE character. Accordingly, it is important that the phase of the beginning of an SMPTE character, that is, the direction of the level transition at the start of the SMPTE character, be consistent, or compatible, with the phase at the end of the preceding SMPTE character. This means that if the preceding SMPTE character ends with a negative-going transition, the next following SMPTE character should start with a negative-going transition.

In the insert edit operation wherein video signals which had been recorded on the primary tape are replaced by video signals which are played back from the secondary tape, that is, the secondary video signals are "inserted" between two existing segments on the primary tape, the SMPTE time code characters which had been recorded for the particular segment on the primary tape which is being replaced normally remain on the primary tape. Thus, in the insert edit operation, there is no change in the recorded SMPTE characters and, therefore, there is no problem in making sure that the phase at the end of a preceding SMPTE character is compatible with the phase at the beginning of the next following SMPTE character. However, in the assemble edit operation, a new SMPTE time code is recorded together with the new video signals which are recorded from the secondary video tape. Since the new SMPTE time code characters are not recorded during the same operation that the preceding SMPTE time code characters were recorded, it is possible that the phase at the beginning of a new character may not be compatible with the phase at the end of the preceding, previously recorded character. It has been thought that this problem can be solved by, for example, reading the next-to last SMPTE time code character which is recorded on the primary tape just prior to the assemble edit location thereon and then interpolate the information represented by the read character such that the content of the last character can be ascertained, and thus the phase at the end of that last character will be known. Once this phase is known, the new SMPTE time code characters can be generated so as to be compatible therewith. However, this assumes that the last few frames of the previously recorded video signals on the primary tape has been recorded in succession. Thus, the frame count contained in the last character will be one greater than the frame count included in the preceding character, and so on. This technique is not successful if successive frames of video signals are assembled on a frame-by-frame basis, such as for assembling an animated video picture. In that event, the content of the last-recorded SMPTE time code character will not merely be one frame greater than the SMPTE time code character which precedes it.

The above U.S. Patent application Ser. No. 956,449 proposes the apparatus which will solve the above defects. In this apparatus, since the number of "0" s in the time code of one word is selected as an even number, the continuation of time codes is good under any conditions. However, since the number is necessary to be an even number, there occurs such a defect that its circuit construction becomes complicated.

OBJECTS OF THE INVENTION

Therefore, it is an object of the present invention to record SMPTE time codes in a manner which overcomes the aforenoted problems heretofore present in the prior art.

Another object of this invention is to provide improved SMPTE time code generating apparatus wherein the phase at the beginning of an SMPTE time code character always is compatible with the phase at the end of a preceding SMPTE time code character, even if these two characters are not generated in succession.

A further object of this invention is to provide an improved SMPTE time code generator in which the phase relation at the beginning and end of each character remains constant regardless of the contents of that character.

In a broader aspect thereof, it is an additional object of this invention to provide apparatus for generating bi-phase coded characters having a constant phase relation, such as the same phase relation, at the beginning and end of each coded character regardless of the number of bi-phase "1" s and "0" s included therein.

Yet another object of this invention is to provide improved SMPTE time code generating apparatus which generates SMPTE time code characters which are particularly useful in assemble edit operations of a video tape.

Various other objects, advantages and features of the present invention will become readily apparent from the ensuing detailed description, and the novel features will be particularly pointed out in the appended claims.

In accordance with this invention, there is provided a recording time code signal generating apparatus having a time code data signal generating circuit and a time code signal forming circuit which is supplied with the time code data signal from the time code data signal generating circuit and produces a recording time code signal including bi-phase code signals, in which the recording time code signal is corresponded to an information signal and recorded continuously on a recording medium per word unit. In this case, it is so formed that even if the recording time code signal of word unit which consists of bi-phase code signals is connected in a desired number and then recorded on the recording medium, there is produced no discontinuity at the connection point of the time code signals.

BRIEF DESCRIPTION OF THE DRAWINGS

The following description, given by way of example, will best be understood in conjunction with the accompanying drawings in which:

FIGS. 3A to 3F are waveform diagrams which are useful in understanding the operation of the example shown in FIG. 2.

DESCRIPTION OF THE PREFERRED EMBODIMENT

An electronic edition apparatus in which the present invention is incorporated will be firstly described with reference to FIG. 1. In the figure, provided is an electronic editing VTR 5 which has provided with, for example, a pair of recording and reproducing rotary magnetic heads and a pair of rotary erasing magnetic heads on a tape guide drum (not shown), and also provided is a VTR 4 which serves to reproduce a video signal as an information signal from a magnetic tape which is not edited. In the VTR 4, the video signal reproduced from the magnetic tape is selected and then fed to the VTR 5 which then records the applied video signal on a new magnetic tape in an edited state. In this case, separate time code signals (such as the above SMPTE time code signals) are recorded on the respective magnetic tapes in VTRs 4 and 5.

Figure 1:
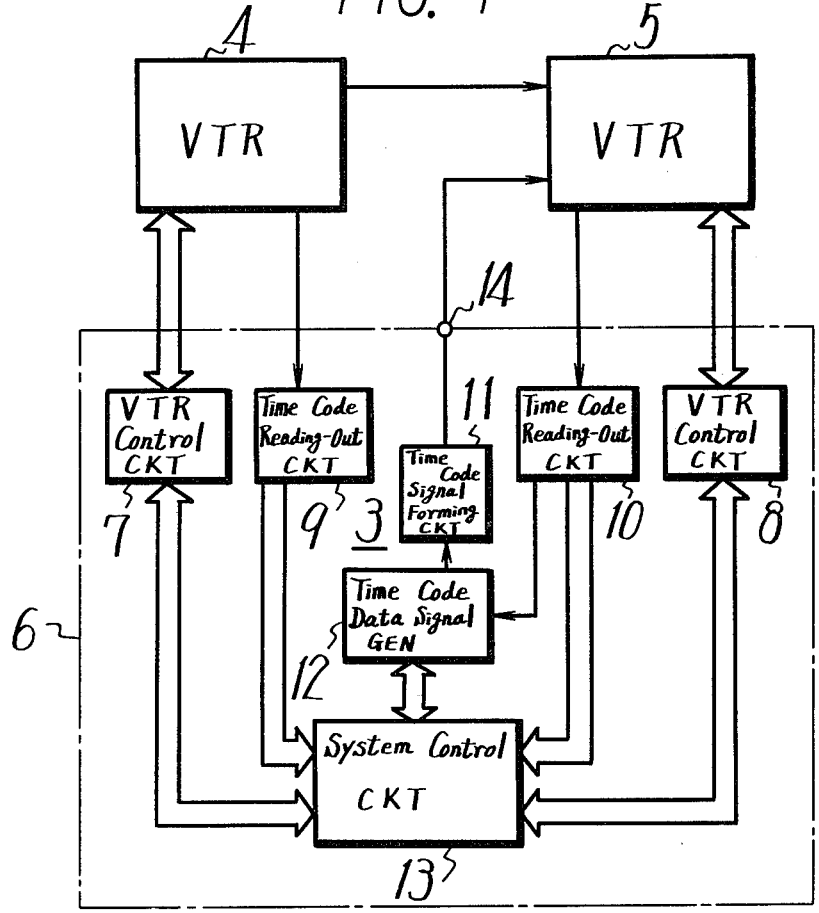
FIG. 1 is a block diagram of editing apparatus according to this invention which can be used in, for example, an assemble edit operation.

One-dot chain line block 6 in FIG. 1 designates an electronic editing apparatus which includes a recording time code signal generating apparatus 3. This time code signal generating apparatus 3 produces a time code signal to be recorded on the magnetic tape in the electronic editing VTR 5 and hence is formed of a time code data signal generator 12 and a time code signal forming circuit 11 which is supplied with a time code data signal from the time code data signal generator 12 and produces a recording time code signal consisting of bi-phase coded signals. The recording time code signal from the time code signal forming circuit 11 is fed through and output terminal 14 to the VTR 5 and recorded therein on a cue track or audio track of a magnetic tape as a recording medium per word unit in correspondence with the respective frames of a video signal as an information signal.

The electronic editing apparatus 6 further including VTR control circuits 7 and 8 corresponding to the VTR's 4 and 5, which are connected to VTR's 4 and 5 through control buses, respectively, and time code reading-out circuits 9 and 10, which read out the time codes contained in the time code signals reproduced from VTR's 4 and 5 and which control circuits 9 and 10 are connected through data buses to a system contol circuit 13, respectively. The time code data signal generator 12 is also connected to the system control circuit 13 through a control bus.

Figure 2:
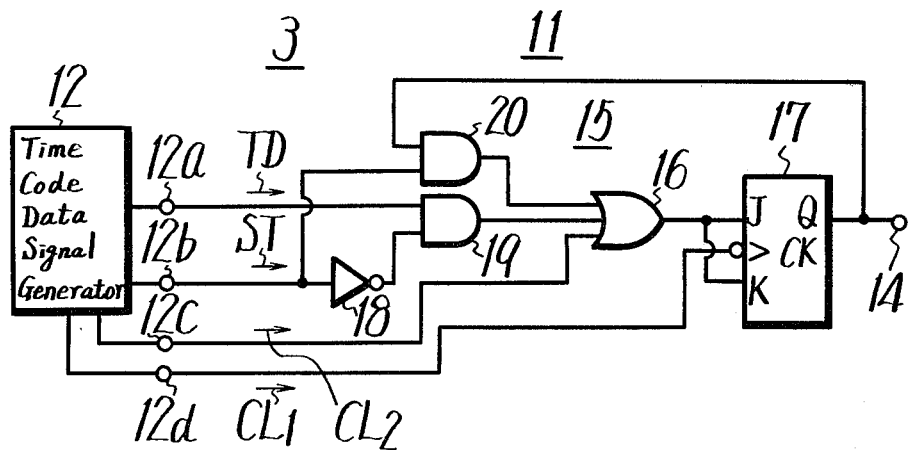
FIG. 2 is a partial block, partial logic diagram showing a practical example of a part of FIG. 1.

The recording time code signal generating apparatus 3 will be described with reference to FIG. 2. As described above, this recording time code signal generating apparatus 3 is formed of the time code data signal generator 12 and the time code signal forming circuit 11. Especially, in the time code signal forming circuit 11, provided is means 15 which detects the polarity of a specific bit signal of a fixed binary value or bit in the recording time code signal of word unit (bi-phase code signals) and change the fixed binary bit in accordance with the detected polarity.

The time code data signal generator 12 produces at its one output terminal 12a time code data signal TD of a binary code corresponding to the above SMPTE time code, as shown in FIG. 3D, and at its other output terminals 12d and 12c first and second clock signals CL1 and CL2 as shown in FIGS. 3A and 3B, respectively. The clock signals CL1 and CL2 are such clock signals which serve to provide a time code signal TC consisting of bi-phase code signals as shown in FIG. 3E. The clock signal CL1 is so selected that its frequency is twice as that of the clock signal CL2 and the falling-down of clock signal CL2 is in synchronism with the falling-down of clock signal CL1, and the time code data signal TD shown in FIG. 3D is so formed that its bit signal is synchronized with one period of clock signal CL2. Each period of clock signal CL2 i.e. each bit of time code data signal TD is marked with numbers of $T_{n-3}, T_{n-2}, 14 T_{n+8}$ as shown in FIG. 3.

Although the changing means 15 is formed of AND-circuits 19, 20 and an inverter 18 in the example of FIG. 2, at first, this means 15 is not considered in the following description. The time code data signal TD and clock signal CL2 are fed to an OR-circuit 16, and the output therefrom is fed commonly to J-and D-input terminals of a JK-flip-flop circuit 17 which is also supplied at its CK (clock)-input terminal with clock signal CL1 after being phase-inverted. Thus, the flip-flop circuit 17 produces at its Q-output terminal i.e. output terminal 14 a time code signal TC consisting of bi-phase code signals as shown in FIG. 3E. This time code signal TC is provided by making the time code data signal TD as a bi-phase coded signal. In the case where the above changing means 15 is not provided, when the time code data signals TD shown in FIGS. 3D and 3D' are bi-phase-coded, there will occur such a case that a time code signal TC' is produced as shown in FIG. 3F which is inversed in polarity as compared with the time code signal TC shown in FIG. 3E (in the figure only bits of $T_{n-3}$ to $T_{n-1}$ are shown). To avoid this defect, the above changing means 15 is provided to change the phase of time code signal TC' to be in phase with the time code signal TC of word unit at its specific bit signals or respective bit signals after the bit signals of the Tn bit signal in this example. To this end, a strobe signal ST (refer to FIG. 3C), which has a time width corresponding to the period of the specific bit signal whose binary bit is fixed to, for example, "0" such as an empty bit of the SMPTE time code signal for a user, is derived from an output terminal 12b of time code data signal generator 12 once per the time code signal of one word. This strobe signal ST is fed after being inversed in phase by inverter 18 to the AND-circuit 19 and fed, as it is, to the other AND-circuit 20. The output from AND-circuit 19, which is supplied with the time code data signal TD as set forth above, is fed to OR-circuit 16. The AND-circuit 20 is also supplied with the output at the Q-output terminal of the JK-flip-flop circuit 17, and the output from the AND-circuit 20 is fed to OR-circuit 16. p If the above strobe signal ST is produced at, for example, the Tn bit in the empty bits $T_{n-1}$ to $T_{n+2}$ for the user wherein the binary bits are "0", when the output in the former half period in the Tn bit of JK-flip-flop circuit 17 is in low level as shown in FIG. 3E, the output in the latter half period is made in the same low level, while when the level in the former half period is high as shown in FIG. 3F, the level in the latter half period is changed into the low level. Thus, in FIG. 3F the binary bit "0" is changed into "1" in the Tn bit. Accordingly, as shown in FIGS. 3E and 3F, after arrows indicating the boundary between the Tn and $T_{n+1}$ bits, the time code signals TC and TC' become same in polarity and hence the respective bit signals of the time code signals TC and TC' after the $T_{n+1}$ bit become same in polarity.

As a result, since the polarity of the bit signal of the time code signal of one word at its end is fixed, the continuous time code signals of one word are recorded on the magnetic tape with a continuous recording pattern.

Next, the manner to carry out the electronic editing operation will be described. A video signal which is not edited is recorded on the magnetic tape of VTR 4 together with an inherent time code signal. The editing VTR 5 selects the reproduced video signal from VTR 4 and records the same on the magnetic tape together with a new time code signal. In the case that the video signal of N frames reproduced from the magnetic tape of VTR 4 at a certain portion is recorded on the magnetic tape of VTR 5 as one cut, the video signals having frames more than N frames by several frames (several m sec. to several 10 m sec) are recorded together with an inherent time code signal and the video signals of M frames of another one cut from the VTR 4 are recorded in superimposed on the excessive portion of the former one cut video signals i.e. erasing the excessive portion together with inherent time code signal so as to make the junction between the video signal and time code signal smooth.

Meanwhile, in the recording time code signal generating apparatus 3, the time code signal is automatically delivered to the output terminal 14 in accordance with the constant travelling speed of the magnetic tape in the VTR 5, but the time code data signal generator 12 can be preset by the time code data signal from the time code reading out circuit 10. Accordingly, the recording of the video signal at the second cut in VTR 5 is carried out in the following manner. That is, the VTR 5 is rewound to reproduce the video signal of the first one cut and the recording of the video signal of the second one cut from VTR 4 is initiated at the time when the video signal of N frames is reproduced completely. In this case, the video signals more than M frames by several frames are also recorded. Meanwhile, during time period in which the video signal of one cut is reproduced, the time code signal, which is recorded in correspondence with the video signal of one cut, is reproduced and then read out by the time code reading out circuit 10, and the termination of the video signal of N frames is detected by the read-out time code signal. Then, the time code data signal from the time code reading out circuit 10 at that time is fed to the time code data signal generator 12 to preset the same, and thereafter the time code signal corresponding to the video signal at the second cut is recorded continuously on the magnetic tape.

As the above information signal, an audio signal of PCM and so on could be used in addition to the video signal of a television signal, and as the recording medium, a magnetic medium such as a magnetic disc, magnetic drum or the like and a recording medium of an optical system, pressure sensitive system and so on can be used in addition to the magnetic tape.

Further, it is of no need that the change of the binary bit of the specific bit signal in the time code signal consisting of bi-phase coded signals is limited from "0" to "1" but the change could be carried out from "1" to "0".

According to the present invention described as above, a signal generating apparatus is provided by which even if the time code signal of word unit consisting of bi-phase coded signals is recorded on the recording medium continuously in a desired number, the recording time coded signal of word unit consistng of the bi-phase coded signals with no discontinuity at the junction point between adjacent time coded signals can be produced. Accordingly, if such time coded signal is recorded on the recording medium per word unit in correspondence with the track unit, field unit or frame unit of the information signal, the assemble edition of the information signal at the track unit, field unit or frame unit thereof can be easily carried out.

It will be apparent that many modifications and variations could be effected by one skilled in the art without departing from the spirits or scope of the novel concepts of the present invention.

I claim as my invention:

1. An apparatus for generating a recording time code signal comprising:
    a time code data signal generator for generating successive multi-bit binary time code data signals;
    a time code signal forming circuit which is supplied with said successive time code data signals for producing corresponding successive recording time code signals, each consisting of a multi-bit bi-phase code signal which, at any given time, has one of two signal levels and in which the value of each bit is represented by the number of transitions between said signal levels during a bit interval; and
    means provided in said time code signal forming circuit for detecting which of said signal levels said bi-phase coded signal has during a predetermined binary bit in each of said successive recording time code signals and for causing said predetermined bit to maintain its signal level if said detected signal level is a first of said signal levels and otherwise to change its signal level, so that a bit immediately following said predetermined bit within each of said successive recording time code signals starts with a transition to a predetermined one of said two signal levels.

2. An apparatus for generating a recording time code signal according to claim 1 further including mean for presetting said time code data signal generator in accordance with a given time code.

3. An apparatus for generating a recording time code signal as claimed in claim 1, wherein said means for detecting includes a detector for detecting which of said two signal levels said bi-phase coded signal has at the beginning of said predetermined binary bit.

* * * * *